United States Patent [19]
Jones et al.

[11] Patent Number: 6,020,394
[45] Date of Patent: Feb. 1, 2000

[54] CROSSLINKING OF POLYMERS

[75] Inventors: Richard A. Jones; Ian M. Ward, both of Leeds, United Kingdom

[73] Assignee: Celgard LLC, Charlotte, N.C.

[21] Appl. No.: 09/027,709

[22] Filed: Feb. 23, 1998

[51] Int. Cl.[7] .................. C08F 2/50; C08F 2/48; C08J 3/28

[52] U.S. Cl. ............ 522/33; 522/113; 522/114; 522/125; 522/157; 522/161

[58] Field of Search ............ 522/130, 113, 522/157, 161, 125, 114, 33, 40, 41, 42, 43, 44

[56] References Cited

U.S. PATENT DOCUMENTS

| | | | |
|---|---|---|---|
| 3,294,869 | 12/1966 | Robinson et al. | 522/161 |
| 3,426,754 | 2/1969 | Bierenbaum et al. | 128/156 |
| 3,558,764 | 1/1971 | Isaacson et al. | 264/210 |
| 3,679,538 | 7/1972 | Druin et al. | 161/159 |
| 3,720,321 | 3/1973 | Coughlin et al. | 522/161 |
| 3,801,404 | 4/1974 | Druin et al. | 156/229 |
| 3,843,761 | 10/1974 | Bierenbaum et al. | 264/210 |
| 3,853,601 | 12/1974 | Taskier | 117/98 |
| 3,955,014 | 5/1976 | Mostev et al. | 427/54 |
| 4,138,459 | 2/1979 | Brazinsky et al. | 264/154 |
| 4,726,989 | 2/1988 | Mrozinski | 428/315.5 |
| 4,994,335 | 2/1991 | Kamaei et al. | 429/254 |
| 5,552,104 | 9/1996 | DeNicola, Jr. et al. | 522/161 |
| 5,594,041 | 1/1997 | Dearnaley et al. | 522/113 |
| 5,859,088 | 1/1999 | Peterson et al. | 522/161 |

FOREIGN PATENT DOCUMENTS

| | | | |
|---|---|---|---|
| 0641827 | 5/1962 | Canada | 522/113 |
| 59-053540 | 3/1984 | Japan . | |
| 4089844 | 3/1990 | Japan . | |

OTHER PUBLICATIONS

Journal of Applied Polymer Science vol. 56, 936–946 (1995).
Derwent Abstracts for JP 3296540; Dec. 1991.
J 3296539, Derwent Abstract, Dec. 1991.

*Primary Examiner*—Susan W. Berman
*Attorney, Agent, or Firm*—Robert H. Hammer, III

[57] ABSTRACT

A process for preparing a modified polyalkylene, preferably polyethylene or polypropylene, polymer product is described. The process involves treating the polymer in an impregnation step with UV radiation in the presence of a carbonyl bearing photoinitiator species and a crosslinking species. The radiation may take place in a gaseous or liquid environment which is substantially free of oxygen gas but which comprises at least one of the species.

35 Claims, 4 Drawing Sheets

CROSSLINKING OF POLYMERS

BACKGROUND OF THE INVENTION

This invention relates to a process for crosslinking polyalkylene polymers, particularly polyethylene and polypropylene polymers. The process employs steps of irradiation and, preferably, annealing. The invention further relates to crosslinked polyalkylene polymers produced by the process.

There have been earlier proposals to crosslink polyalkylene polymers, by processes which employ UV radiation. However, there is an inherent difficulty, as it is deemed necessary to incorporate the photoinitiator and the crosslinking agent in the melt blend prior to the ionizing step. In the Journal of Applied Polymer Science, 56, pp 935–946, (1995), Zamotaev et.al. have used Xanthone (XN) to photoinduce crosslinking with triallyl cyanurate (TAC) in LDPE, PP and LDPE/PP blends, pressed into sheets 0.4 mm thick. These authors use high concentrations of the additives (XN≈0.3% and TAC≈2.0%) pre-mixed in the polymer blends before melt compounding. In addition, the irradiations were carried out at 170° C. in air. Japanese patent application number 41865651, Japanese patent application number 3296540, Japanese patent application number 3296539 and Japanese patent application number 4089844 disclose the use of benzophenone and/or derivatives of benzophenone and triallyl isocyanurate as a photosensitiser and a crosslinking agent respectively. The photosensitiser and crosslinking agent are incorporated with the crystalline polyolefin as part of the moulded part and the moulded part is irradiated using UV light of different frequencies.

Both techniques are limited by the requirement to incorporate the photoinitiator and the crosslinking agent in the polymer matrix prior to irradiation.

JP 59053540 describes the technique of coating a polyethylene film with a photosetting mixture which includes a photopolymerisation initiator such as benzophenone and a crosslinkable monomer. After coating, UV irradiation takes place to harden the surface of the film.

DE 2165438 describes how a polyethylene foil is brushed with a UV sensitiser solution and crosslinked by irradiation with UV light. The sensitiser solution includes benzophenone in an organic solvent. The polyethylene foil is said to be crosslinked by the process.

Both of these methods suffer from the drawback of a lack of penetration into the polymer matrix and are only directed to surface treatment of the polymer.

OBJECT AND SUMMARY OF THE INVENTION

It is an object of the invention to provide a process for obtaining crosslinked polyalkylene polymers which are modified or improved, in comparison with earlier crosslinked polyalkylene polymers. It is a further object of this invention to provide such modified or improved polyalkylene polymers.

In accordance with the present invention there is provided a process for preparing a modified polyalkylene polymer product from a precursor polyalkylene polymer product, the process comprising the step of treating said precursor polymer with UV radiation after an impregnation step with a carbonyl bearing photoinitiator species and a crosslinking species. The radiation may take place in a gaseous or liquid environment which is substantially free of oxygen gas but which comprises at least one of the said species.

Preferably, the impregnation step comprises exposing the product to at least one of the species for sufficient time to allow diffusion of the species into the product. Preferably, such exposure of the product takes place above ambient temperature, more preferably, above 40° C., most preferably, above 60° C.

Preferably, such exposure of the product takes place for at least one hour, more preferably, at least three hours, most preferably, at least 10 hours.

Preferably, both species are in the gaseous or liquid environment but it is envisaged that one of the species may already be present in the precursor polyethylene polymer product.

By "gaseous" is meant herein that the sensitising atmosphere is in the gas phase, either above or below its critical temperature at the irradiation temperature.

A problem encountered in modifying polyalkylene polymers by crosslinking in a gaseous or liquid environment is the necessity to provide photoinitiators and bridging agents which impregnate the precursor polymer products to a sufficient degree to allow crosslinking under UV radiation. Thus, preferably, the photoinitiator species is sufficiently small to penetrate the surface of the precursor matrix. A photoinitiator species as defined herein may be an aldehyde or a ketone of the type $R_1 C (O) R_2$, wherein $R_1$ is selected from the group consisting of: a hydrogen atom; a $C_1$–$C_6$ alkyl group which may be substituted by either one or two substitutents selected together from halogen atom, hydroxy or carboxy group; a $C_2$–$C_6$ alkenyl group which may be substituted by one or two substitutents selected together from halogen atom, hydroxy or carboxy group; a $C_2$–$C_6$ alkynyl group which may be substituted by either one or two substitutes selected together from halogen atom, hydroxy or carboxy group; a $C_3$–$C_6$ cycloalkyl group which may be substituted by carboxy group, halogen atom or hydroxy group; a $C_1$–$C_6$ alkoxy group which may be substituted by either one or two substitutents selected together from halogen atom, carboxy group or hydroxy group; a phenyl group which may have 1, 2 or 3 substituents selected from the group consisting of cyano group, halogen atom, carboxy group, hydroxy group, $C_1$–$C_3$ alkoxy group, $C_1$–$C_3$ alkyl group or amino group and wherein $R_2$ may be selected from the group consisting of: a hydrogen atom; a $C_1$–$C_6$ alkyl group which may be substituted by either one or two substitutents selected together from halogen atom, hydroxy or carboxy group; a $C_2$–$C_6$ alkenyl group which may be substituted by one or two substitutents selected together from halogen atom, hydroxy or carboxy group; a $C_2$–$C_6$ alkynyl group which may be substituted by either one or two substitutes selected together from halogen atom, hydroxy or carboxy group; a $C_3$–$C_6$ cycloalkyl group which may be substituted by carboxy group, halogen atom or hydroxy group; a $C_1$–$C_6$ alkoxy group which may be substituted by either one or two substitutents selected together from halogen atom, carboxy group or hydroxy group; a phenyl group which may have 1, 2 or 3 substituents selected from the group consisting of cyano group, halogen atom, carboxy group, hydroxy group, $C_1$–$C_3$ alkoxy group, $C_1$–$C_3$ alkyl group or amino group.

Examples of $C_1$–$C_6$ alkyl group as the substituents in $R_1$ and $R_2$ are straight or branched chain alkyl groups having 1 to 6 carbon atoms such as methyl, ethyl, propyl, pentyl, hexyl, 2-methylpropyl, 3-methylbutyl, 4-methylpentyl, 1-methylpropyl, 1-methylbutyl, 1-methylpentyl, and the like.

Examples of halogen atom as substituents in $R_1$ and $R_2$ are fluorine, chlorine, bromine or iodine atom.

Examples of $C_2$–$C_6$ alkenyl group as the substituents in $R_1$ and $R_2$ are straight or branched chain alkenyl groups having 2 to 6 carbon atoms such as ethenyl, 1-propenyl, 2 -propenyl, 1-butenyl, 2-butenyl, 1,3-butadienyl, 1-pentenyl, 1,3-pentadienyl and the like.

Examples of $C_2$–$C_6$ alkynyl group as the substituents in $R_1$ and $R_2$ are ethynyl, 1-propynyl, 2-propynyl, 1-butynyl, 2-butynyl, 3-butynyl, 1-pentynyl, 1 hexynyl and the like.

Examples of $C_3$–$C_6$ cycloalkyl group as the substituent in $R_1$ and $R_2$ are cyclopropyl, cyclobutyl, cyclopentyl, cyclohexyl and the like.

Examples of $C_1$–$C_6$ alkoxy group as the substituent in $R_1$ or $R_2$ are straight or branched chain alkoxy groups having 1 to 6 carbon atoms such as methoxy, ethoxy, propoxy, 1-methyl ethoxy, butoxy, 2-methylpropoxy, pentyloxy, 3-methylbutoxy, 1,1-dimethylethoxy, hexyloxy, 4-methylpentyloxy and the like.

More specifically $R_1$ and $R_2$ in general formula $R_1$ C (O) $R_2$ is selected from: hydrogen, methyl, ethyl, propyl, butyl, pentyl, hexyl, 1-methylethyl, 2-methylpropyl, 3-methylbutyl, 1-methylbutyl, chloromethyl, 2-carboxyethyl, ethenyl, 3-propenyl, ethynyl, 3-propynyl, 3-butynyl, phenyl, 4-methylphenyl, 4-methoxyphenyl, 4-hyroxyphenyl, 4-(carboxymethyloxy)phenyl, 4-fluourophenyl, 4-cyanophenyl, 4-aminophenyl, or cyclohexyl.

Specific compounds of formula $R_1$ C(O) $R_2$ include: acetaldehyde, benzaldehyde, acetone, methylethylketone, acetophenone, benzophenone and xanthone. Especially preferred compounds include benzaldehyde, methylethylketone and acetophenone. More preferred are ketones, especially, acetophenone.

Preferably, where $R_1$ is phenyl, $R_2$ is aliphatic and comprises a $C_1$–$C_4$ chain. Alternatively, where $R_2$ is phenyl, $R_1$ similarly comprises an aliphatic $C_1$–$C_4$ chain. Preferably, where $R_1$ or $R_2$ is phenyl, the other moiety is aliphatic and is $C_1$–$C_3$, more preferably $C_1$–$C_2$, most preferably $C_1$. Limiting the size of the carbonyl bearing photoinitiator species in this manner improves impregnation into the precursor polymer product. Preferably, the phenyl group is unsubstituted.

A polyalkylene polymer as defined herein may be a polyethylene homopolymer or a copolymer containing a major proportion of polyethylene, alternatively, it may be a polypropylene homopolymer or a copolymer containing a major proportion of polypropylene.

A polyethylene copolymer comprising a major proportion of polyethylene as defined herein is one comprising more than 50% by weight of polyethylene.

Preferably, it has more than 70% by weight of polyethylene, most preferably, more than 85% by weight of polyethylene.

A polypropylene copolymer comprising a major proportion of polypropylene as defined herein is one comprising more than 50% by weight of polypropylene. Preferably, it has more than 70% by weight of polypropylene, most preferably, more than 85% by weight of polypropylene.

A polyethylene polymer as defined herein may be unsubstituted or substituted, for example by halogen atoms, preferably fluorine or chlorine atoms. Unsubstituted polyethylene polymers are however preferred.

A polypropylene polymer as defined herein may be unsubstitued or substitued, for example by halogen atoms, preferably fluorine or chlorine atoms. Unsubstituted polyethylene polymers are however preferred.

A polyethylene copolymer comprising a major proportion of polyethylene may have one or more different copolymers, following copolymerization with, for example, one or more of ethylene, butadiene, vinyl chloride, styrene or tetrafluoroethylene. Such a polyethylene copolymer may be a random copolymer or a block or graft copolymer. A preferred polyethylene copolymer is propylene-ethylene copolymer, having a major proportion of polyethylene and minor proportion of polypropylene.

A polypropylene copolymer comprising a major proportion of polypropylene may have one or more different copolymers, following copolymerization with, for example, one or more of ethylene, butadiene, vinyl chloride, styrene or tetrafluoroethylene. Such a polypropylene copolymer may be a random copolymer or a block or graft copolymer. A preferred polypropylene copolymer is propylene-ethylene copolymer, having a major proportion of polypropylene and minor proportion of polyethylene.

Polyethylene homopolymer is preferred for use in the process of the invention.

Preferably the polyalkylene polymer undergoes a further step of annealing after being subjected to UV radiation. Further, the annealing step takes place in an environment which is substantially free of oxygen gas but which comprises at least one of the said species. Preferably, the annealing step takes place in an environment which is substantially free of oxygen gas and comprises both of the said species. Preferably, the annealing step takes place at a temperature which avoids rapid evaporation of the species. Typically, the annealing step takes place at a temperature between 50° C. and 120° C., more preferably between 70° C. and 110° C., most preferably between 80° C. and 110° C.

Preferably, the polyalkylene polymer is annealed at an annealing temperature at least 20° C. below its melting point, more preferably at an annealing temperature which is below its melting point by a temperature differential in the range 20° C. to 50° C., inclusive, most preferably 30° C. to 40° C., inclusive.

The period for which annealing is carried out is not thought to be critical, provided that the time is sufficient for substantially all of the polymer which has been irradiated to reach the said annealing temperature and for substantially all of the radicals formed to have reacted. This can be assessed by trial and error following ESR or mechanical testing of irradiated and annealed samples; the presence of unreacted radicals leads to chain scission and diminution in mechanical properties.

Preferably, the environment for the annealing step is a gaseous environment.

There is no necessity for the said environment in the UV radiation step and the annealing steps to be the same. Indeed there is no necessity for the said species used during the irradiation step to be the same as the said species used during the annealing step; the species used in the irradiation step could be replaced in whole or in part by different species for the annealing step. However it is believed that the properties desired of said species in the irradiation step will generally be the same as those required in the annealing step, so there will generally be no necessity to effect a whole or partial replacement. Most conveniently, therefore, the species are the same throughout. In some cases however it may be advantageous to supply a further change of said species, as the process proceeds.

For either or both steps, a mixture of species could be employed.

The environment employed for the irradiation and/or the annealing steps is preferably constituted entirely by the said species, but may also comprise a mixture being said species together with one or more other components, for example an inert gas or liquid. Suitably the said species are gaseous at least under the treatment conditions employed and are employed in the irradiation and/or annealing steps at a partial pressure in the range of 0.5–4 atmospheres ($5 \times 10^4$ pa–$4 \times 10^5$ pa), preferably 0.8–2 atmospheres ($8 \times 10^4$ pa–$2 \times 10^5$ pa).

Preferred crosslinking species for use in the present invention, in either or both of the irradiation and annealing steps, are those which are gaseous under the treatment conditions employed and should be able to diffuse into the polyethylene polymer under the treatment conditions employed. Preferred species are unsubstituted alkynes or alkenes, i.e, alkynes or alkenes made up substantially or entirely by hydrogen and carbon atoms, preferably unsubstituted $C_{4-8}$ alkenes having at least two double bonds, preferably only two double bonds, for example 1,3 butadiene, 1,3 pentadiene, 1,3 hexadiene, 1,4 hexadiene and 1,3,5 hexatriene (of which species 1,3,5 hexatriene is preferred).

One preferred class of alkenes for use as crosslinking agents in the present invention has at least two conjugated double bonds, thus including 1,3 butadiene, 1,3 pentadiene, 1,3 hexadiene and 1,3,5 hexatriene. Preferably the conjugation extends throughout the length of the compound, as is the case with 1,3 butadiene and 1,3,5 hexatriene.

A particularly preferred class of alkenes has at least two conjugated double bonds, preferably with the conjugation extending throughout the length of the compounds, and double bonds at least as the terminal bonds of the compounds. Compounds of this type thus include 1,3 butadiene and 1,3,5 hexatriene.

Preferably said alkyne or alkene having at least two double bonds is the sole crosslinking agent employed in the irradiation step and/or the annealing step.

It is believed that carbonyl bearing compounds like acetophenone, quinones and flavins, typically extract hydrogen atoms from hydrogen donating substrates upon excitation. The lone pair of electrons enter into n>π* transition, giving the molecule a measure of electrophilic biradical character. The reactive state of acetophenone is the triplet state, because for $^3AP^*$ the $\Phi_{ics}$ (0.99) and $E_T$ (73.6 kcal/mol in rigid hydrocarbon solvents) are high. $^3AP^*$ is also relatively stable and long lived. Initial excitation may sometimes be π>π*, but vibronic coupling between close lying n>π* transitions yields mixing of the ππ*/nπ* states and similar degrees of electrophilic biradical characters. Differentiation between the two states cannot be made and the hydrogen atom abstractions which follow are outlined in scheme 1 (FIG. 4).

There is the potential for two hydrogen atom abstractions from each $^3AP^*$ excitation. After initiation of radicals in the LLDPE, crosslinking is believed to take place by a chain reaction. If $^3AP^*$ adds to the occasional crosslinking species, it would still result in the generation of two further radical sites. Preferably, the crosslinking agent is chosen from a suitable compound which forms radicals upon hydrogen extraction and which does not result in the loss of radical sites. Hydrogen atom extraction may cause ring opening and suitable crosslinking agents also include $C_{3-9}$ cycloalkanes. Examples of cycloalkanes include cyclopropane, cyclobutane, cyclopentane, cyclohexane, cycloheptane, cyclooctane and the like. Preferably, cyclohexane is used. For example, hydrogen atom extraction from cyclohexane may results in ring opening and the hex-6-ene-1-yl radical is formed. Cycloalkanes, such as cyclohexane form very good solvents and can be easily combined with suitable carbonyl bearing photoinitiators using the cycloalkane as the solvent. Furthermore, cycloalkanes such as cyclohexane are considerably safer to use on an industrial scale than alkenes having conjugated double bonds such as 1,3, 5-hexatriene and are more economically viable.

Suitably, the irradiation step is effective at a temperature not exceeding 100° C., preferably not exceeding 80° C. A preferred range is 0–50° C., most preferably 15–30° C. Conveniently the step is effected at ambient temperature.

In carrying out the process of the invention, any UV radiation can be employed. In practice, however, the types of UV radiation sources which can be used with greatest practicality include xenon arc lamps, high pressure mercury lamps and combination mercury/rare gas lamps. Suitable power levels for these lamps may be chosen in accordance with the thickness of the polymer to which the UV radiation is to be applied. Suitable power levels include 150 W, 250 W, 500 W, 1000 W or greater.

The process of the invention may be applied to polyethylene polymers in respect of their physical form, for example whether they be films, fibres, sheets or moulded articles. In the case of thick sheets and moulded articles the annealing step may need to be relatively long in order to obtain adequate diffusion of said species. In commercial practice, therefore, the invention is likely to have greatest application to fibres and, especially, to films. The invention is likely to be especially useful in the treatment of microporous films used as membranes, for example as medical dressings, filter membranes, gas exchange membranes and battery separators. Illustrative patents relating to such microporous films are U.S. Pat. Nos. 3,426,754, 3,558, 764, 3,801,404, 3,679,538, 3,843,761, 3,853,601, 4,138,459, 4,539,256, 4,726,989 and 4,994,335. The films described generally have pores connected to each other therein and an average pore size of 1000–2000A.

The grade of polyalkylene polymer treated in the process of the present invention is not thought to be critical. The process is expected to be applicable to all grades of homopolymeric polyalkylene, and the polyalkylene copolymers defined above, irrespective of molecular weight, degree of crystallinity, and whether they are pre-quenched or pre-annealed. Preferably, the polymer should be free of UV-protective agents.

In accordance with the present invention there is provided a polyalkylene polymer treated in accordance with the process of the invention, as defined above.

DESCRIPTION OF PREFERRED EMBODIMENTS

Figure 1:
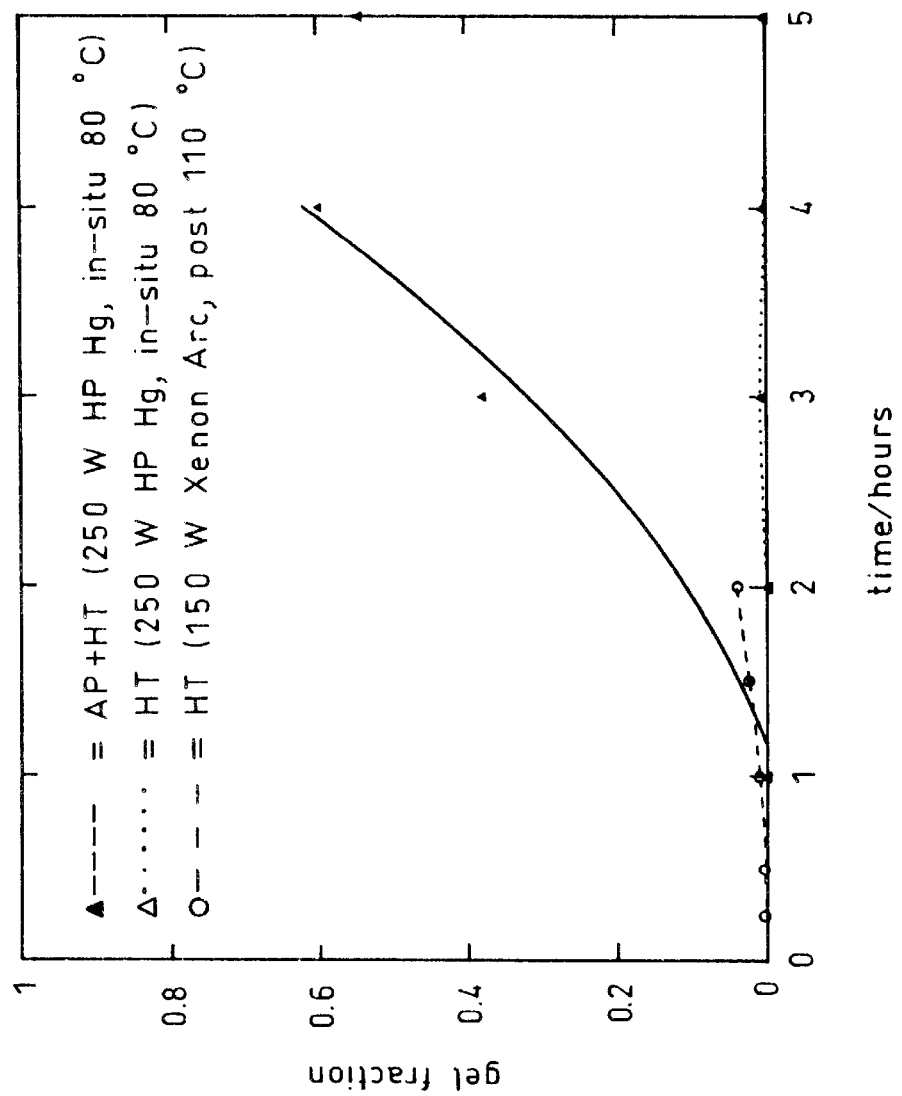
FIG. 1 illustrates gel fraction as a function of photoinitiator, radiation sources and time.

The invention will now be further described, by way of the following examples, which are illustrative only.

EXAMPLE 1

UV Induced Crosslinking of 1,3,5-hexatriene Impregnated LLDPE 1,3,5 hexatriene (HT) is a volatile liquid at room temperature, an experiment was conducted on the UV irradiation of LLDPE in the presence of HT (97% mixture of isomers). Initial experiments were conducted with HT alone, whilst the last experiment incorporated acetophenone (AP) in addition to HT. Three experiments have been conducted on LLDPE sheets (BP Inovex LL0209AA9381X) of slightly varying thickness (ca. 0.25–0.4 mm). The sheets were hot pressed (ca. 20 tons for 2 minutes at 180° C.), quench cooled in cold water and cut into discoid samples (diam. ca. 25 mm). The resulting density was 0.939 g.cm$^{-3}$.

EXAMPLE 1(a)

Samples of the LLDPE (ca. 0.25 mm) were degassed on a vacuum line at a position half way up the sample tube, which contained frozen HT (ca. 0.2 cm$^3$) at the bottom of the tube, for 1 hour. The sample tubes were just slightly dipped into the liquid $N_2$ sufficiently to freeze the HT, but not reduce the temperature of the polymer much below room temperature. The sample tube was then placed in an oven at 110° C. for 1 hour, in order to allow the HT to penetrate the samples. It was calculated that the liquid quantity of HT should be equal to about 1 atmosphere of gaseous HT beyond its boiling point (ca. 76–79° C.). The samples were then placed in front of a Xenon Arc lamp (150 W), in series, at room temperature. The samples continuously purged, with a stream of nitrogen gas, during irradiation were removed at timed intervals and placed back in the sample tube as before and degassed. When all the samples had been irradiated, fresh HT (ca. 0.2 cm$^3$) was placed at the bottom of the tube and degassing continued for a further 45 minutes with the HT portion of the tube immersed in liquid nitrogen. The sample tube was then placed in an oven at 110° C. for 1 hour to anneal all reactive species. The samples were then placed in a vacuum oven at 110° C. to remove excess HT.

EXAMPLE 1(b)

Samples (ca. 0.25 mm) were degassed as in Example 1 (a) for 1 hour, but with about 0.4 cm$^3$ frozen HT in a tube of the same volume. (ca. 2 atmospheres of gaseous HT at temperatures greater than its boiling point). The tube was then placed in a boiling water bath (100° C.) for one hour to allow the HT to penetrate the samples. Samples were then transferred lying flat into a beaker, purged with a slow steady stream of nitrogen gas, in a boiling water bath (100° C.) and covered with cling film. Samples were then UV irradiated (Thorn EMI/D250 W, High Pressure Hg, 250 W system), in parallel (loss of UV due to absorption by cling film is negligible because it is so thin). By this means the samples, directly contacting the base of the beaker, were continuously annealed during irradiation, although there may have been some cooling due to the slow stream of nitrogen gas. The samples were then placed in a vacuum oven overnight at room temperature to remove excess HT.

EXAMPLE 1(c)

A mixture of HT (ca. 0.865 M, 1.8 g in 26 cm$^3$) and AP (ca. 1.603 M, 5 cm$^3$ in 26 cm$^3$) was made up in cyclohexane (CH), and degassed with a slow steady stream of nitrogen gas for one hour. Samples of LLDPE (ca. 0.4 mm) were vacuum degassed (1 hour) and transferred to the mixture, and left to soak in the nitrogen bubbled mixture for 20 hours, covered with cling film. Excess liquid was removed from the beaker to prevent loss of UV absorption by the LLDPE. The samples were then irradiated as in the second experiment, except that they were annealed at about 80° C. continuously, to avoid loss of HT by rapid evaporation from the surface of the polymer. The samples were then placed in a vacuum oven overnight at room temperature to remove excess HT and AP.

Results and Discussion

It can bee seen from FIG. 1 that an extremely low yield of crosslinking was obtained after two hours irradiation of the LLDPE impregnated with HT, using the 150 W Xenon Arc lamp (example 1(a)). The same diagram shows there to be negligible yield of crosslinking when LLDPE is impregnated with HT and irradiated using the 250 W high pressure (HP) Hg lamp (Δ—example 1(b)). This is probably because the Xenon lamp has a broader emission spectrum, emitting well into visible wavelengths, resulting in direct excitation of the HT chromophore. Also, in the same diagram, it can be seen that addition of AP and HT to the LLDPE, by liquid soaking, yields fairly high gel fractions after 4 hours of UV irradiation from the HP Hg lamp (ca. 0.6 Δsolid—example 1(c)). The curve from example 1(c) has a much improved gel fraction versus time rate of increase then the curve from example 1(a). Unfortunately, in this pilot study the curve from experiment 1 is not complete, but it will almost certainly continue to rise at approximately the same rate. Hence, the addition of AP has facilitated a dramatic increase in the absorption of UV and transference of the energy to the crosslinking process.

EXAMPLE 2

UV Irradiation of Impregnated LLDPE

In example 1, we gave results from exercises into the UV activation of impregnated diffusants in LLDPE.

Figure 2:
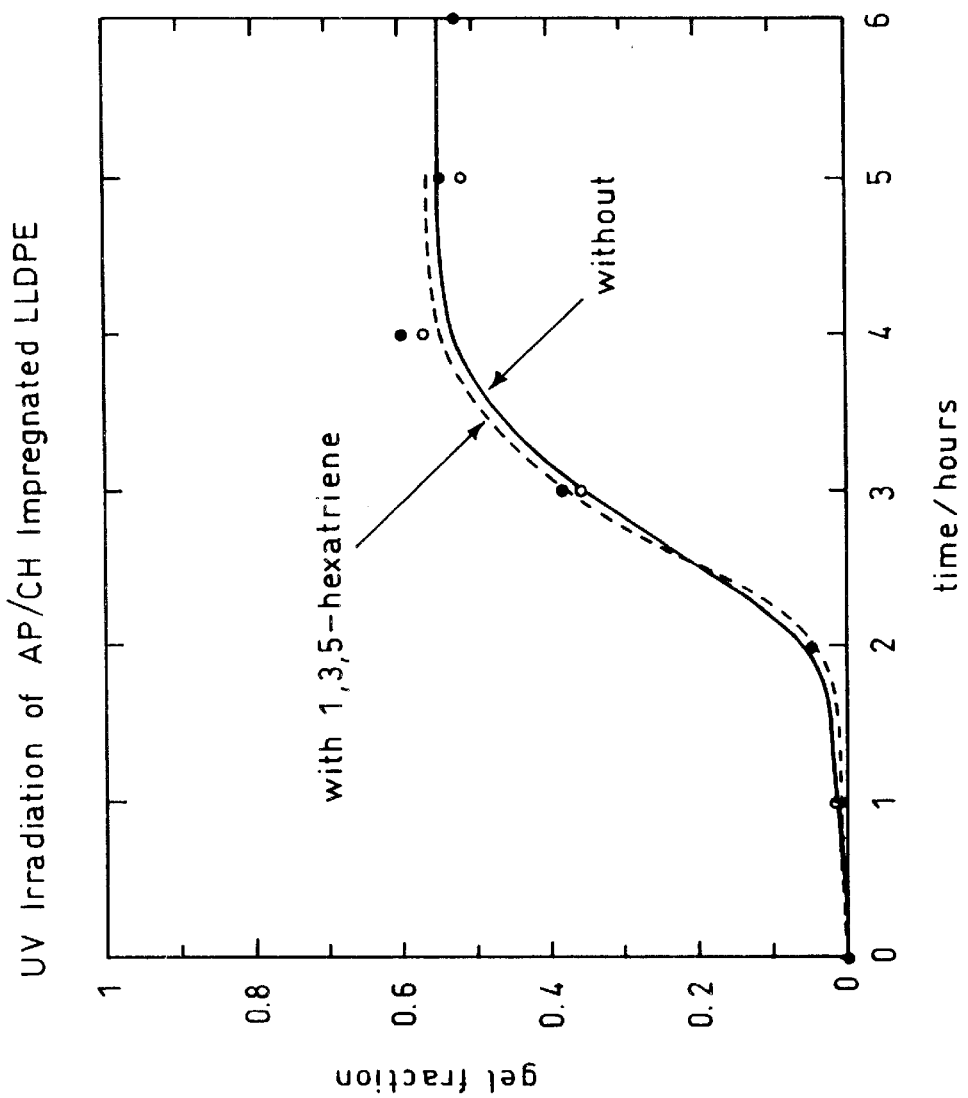
FIG. 2 illustrates gel fraction as a function of photoinitiator, radiation source, and time.

The LLDPE samples were allowed to soak in a 50/50 v/v mixture of acetophenone (AP) and cyclohexane (CH) for 20 hours, as in example 1, but with no 1,3,5-hexatriene present. The UV irradiation and in-situ annealing were conducted as per example 1. The results of the solvent extraction measurements performed on these samples are very similar to those obtained in example 1 for the identical experiment but with 1,3,5-hexatriene present (FIG. 2.). We conclude that although a different lamp was used it really had the same output rating (ca. 250 W). In addition, the 1,3,5-hexatriene can be dispensed with in the presence of excess CH solvent. As mentioned above, the cyclohexane possibly ring opens following hydrogen atom abstraction by $^3$AP* and hydroxy-AP* (Scheme 1) to yield the hexa-5-ene-1-yl* radical, which itself possibly removes hydrogen atoms from adjacent chains causing chain reactions to ensue. This was an unexpected result, as it was expected that a near zero base line similar to known results obtained in the absence of 1,3,5 hexatriene would be found. However, in those earlier base line experiments the AP was also not present. In the absence of the necessity for 1,3,5-hexatriene in the presence of excess CH solvent, the UV-irradiation case becomes more economically viable and of course a much safer proposition.

EXAMPLE 3

Figure 3:
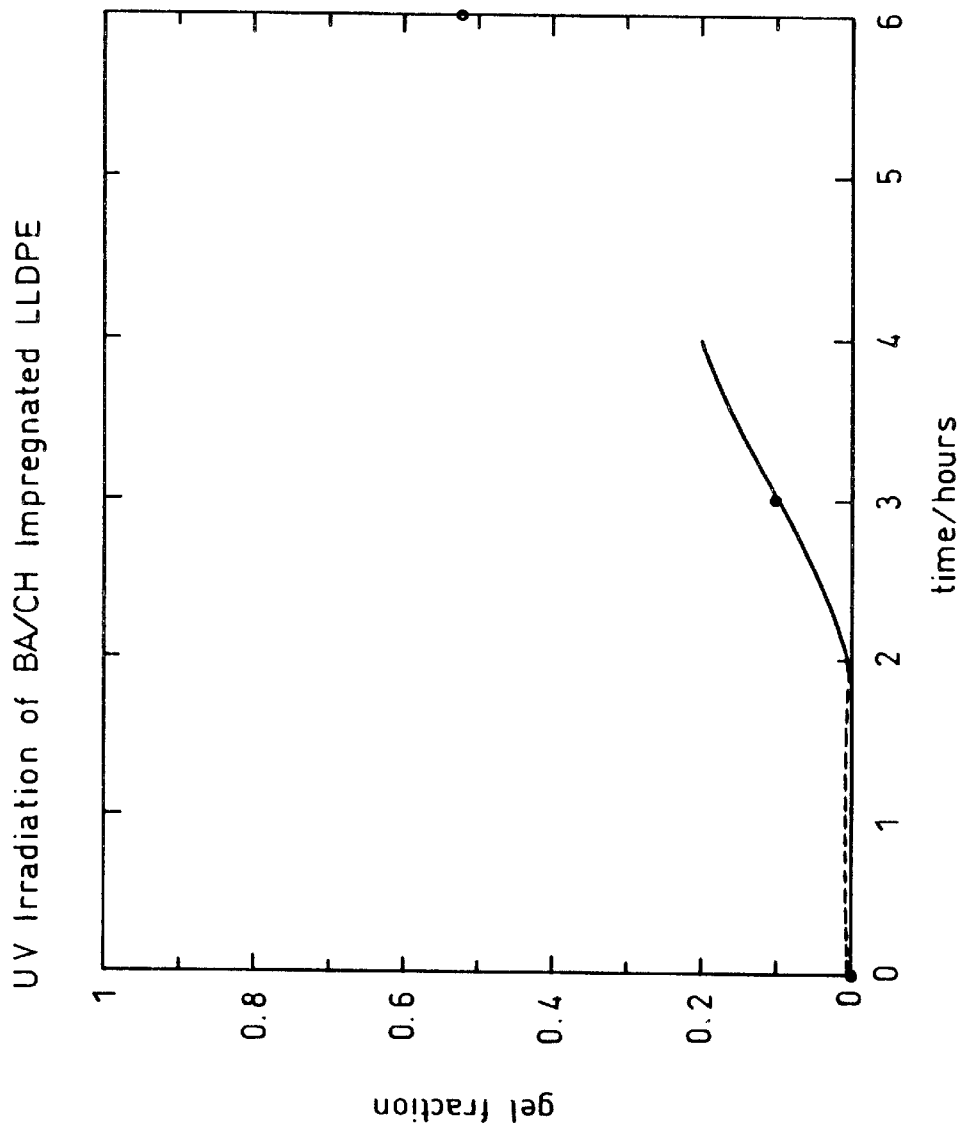
FIG. 3 illustrates gel fraction as a function of photoinitiator, radiation source, and time.
Figure 4:
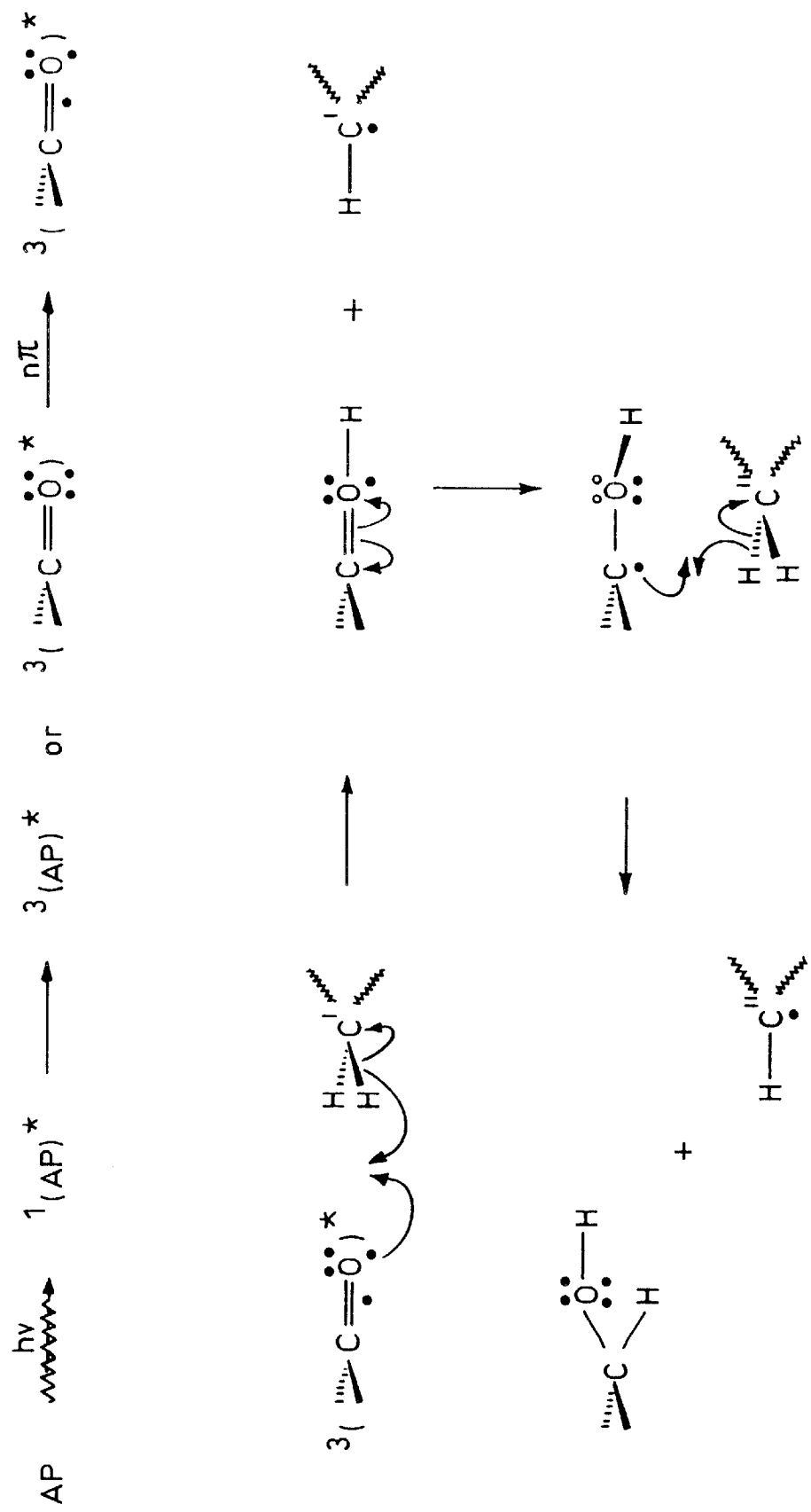
FIG. 4 illustrates a proposed reaction mechanism.

LLDPE samples were allowed to soak in a 50/50 V/V mixture of benzaldehyde (BA) and cyclohexane (CH) for 20 hours, as in example 2 and were tested using the procedure described in example 2. The results are shown in FIG. 3. As can be seen, the benzaldehyde has a positive gel fraction although not as high as that for acetophenone. This indicates that ketones may perform better than equivalent aldehydes.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features. In particular, references to polyalkylene may be substituted by polyethylene and/or polypropylene throughout.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A process for preparing a modified polyalkylene polymer product from a precursor polyalkylene polymer product being selected from the group consisting of a fiber or a microporous film, the process comprising the step of treating said precursor polymer with ultraviolet (UV) radiation after an impregnation step with a carbonyl bearing photoinitiator species and a crosslinking species.

2. A process for preparing a modified polyalkylene polymer product from a precursor polyalkylene polymer product according to claim 1, wherein the impregnation step comprises exposing the product to at least one of the said species for sufficient time to allow substantial diffusion of the species into the product.

3. A process for preparing a modified polymer product from a precursor polyalkylene polymer product according to claim 2, wherein the impregnation step comprises exposure of the product to the said at least one species for at least one hour.

4. A process for preparing a modified polyalkylene polymer product from a precursor polyalkylene polymer product according to claim 1, wherein the photoinitiator species is sufficiently small to impregnate and diffuse into the precursor product.

5. A process for preparing a modified polyalkylene polymer product from a precursor polyalkylene polymer product according to claim 1, wherein the photoinitiator species is an aldehyde or a ketone of the type $R_1$ C (O) $R_2$, wherein $R_1$ is selected from the group consisting of: a hydrogen atom; a $C_1$–$C_6$ alkyl group which may be substituted by either one or two substitutents selected together from halogen atom, hydroxy or carboxy group; a $C_2$–$C_6$ alkenyl group which may be substituted by one or two substitutents selected together from halogen atom, hydroxy or carboxy group; a $C_2$–$C_6$ alkynyl group which may be substituted by either one or two substitutes selected together from halogen atom, hydroxy or carboxy group; a $C_3$–$C_6$ cycloalkyl group which may be substituted by carboxy group, halogen atom or hydroxy group; a $C_1$–$C_6$ alkoxy group which may be substituted by either one or two substitutents selected together from halogen atom, carboxy group or hydroxy group; a phenyl group which may have 1, 2 or 3 substituents selected from the group consisting of cyano group, halogen atom, carboxy group, hydroxy group, $C_1$–$C_3$ alkoxy group, $C_1$–$C_3$ alkyl group or amino group and wherein $R_2$ may be selected from the group consisting of: a hydrogen atom; a $C_1$–$C_6$ alkyl group which may be substituted by either one or two substitutents selected together from halogen atom, hydroxy or carboxy group; a $C_2$–$C_6$ alkenyl group which may be substituted by one or two substitutents selected together from halogen atom, hydroxy or carboxy group; a $C_2$–$C_6$ alkynyl group which may be substituted by either one or two substitutes selected together from halogen atom, hydroxy or carboxy group; a $C_3$–$C_6$ cycloalkyl group which may be substituted by carboxy group, halogen atom or hydroxy group; a $C_1$–$C_6$ alkoxy group which may be substituted by either one or two substitutents selected together from halogen atom, carboxy group or hydroxy group; a phenyl group which may have 1, 2 or 3 substituents selected from the group consisting of cyano group, halogen atom, carboxy group, hydroxy group, $C_1$–$C_3$ alkoxy group, $C_1$–$C_3$ alkyl group or amino group.

6. A process for preparing a modified polyalkylene polymer product from a precursor polyalkylene polymer product according to claim 5, wherein when $R_1$ is phenyl, $R_2$ is aliphatic and comprises a $C_1$–$C_4$ chain.

7. A process for preparing a modified polyalkylene polymer product from a precursor polyalkylene polymer product according to claim 5, wherein when $R_1$ or $R_2$ is phenyl, the other moiety is aliphatic and comprises a $C_1$–$C_3$ chain.

8. A process for preparing a modified polyalkylene polymer product from a precursor polyalkylene polymer product according to claim 7 wherein the aliphatic moiety comprises a $C_1$–$C_2$ chain.

9. A process for preparing a modified polyalkylene polymer product from a precursor polyalkylene polymer product according to claim 7, wherein the aliphatic moiety comprises a $C_1$ carbon.

10. A process for preparing a modified polyalkylene polymer product from a precursor polyalkylene polymer product according to claim 5, wherein $R_1$ or $R_2$ in general formula $R_1$ C (O) $R_2$ are selected from: hydrogen, methyl, ethyl, propyl, butyl, pentyl, hexyl, 1-methylethyl, 2-methylpropyl, 3-methylbutyl, 1-methylbutyl, chloromethyl, 2-carboxyethyl, ethenyl, 3-propenyl, ethynyl, 3-propynyl, 3-butynyl, phenyl, 4-methylphenyl, 4-methoxyphenyl, 4-hyroxyphenyl, 4-(carboxymethyloxy) phenyl, 4-fluorophenyl, 4-cyanophenyl, 4-aminophenyl, or cyclohexyl.

11. A process for preparing a modified polyalkylene polymer product from a precursor polyalkylene polymer product according to claim 10, wherein compounds of formula $R_1$ C(O) $R_2$ are taken from:

acetaldehyde, benzaldehyde, acetone, methylenthylketone, acetophenone, benzophenone and xanthone.

12. A process for preparing a modified polyalkylene polymer product from a precursor polyalkylene polymer product according to claim 11, wherein compounds of formula $R_1$ C(O) $R_2$ are taken from benzaldehyde, methylethylketone and acetophenone.

13. A process for preparing a modified polyalkylene polymer product from a precursor polyalkylene polymer product according to claim 12, wherein the compound is acetophenone.

14. A process for preparing a modified polyalkylene polymer product from a precursor polyalkylene polymer product according to claim 1, wherein the polyalkylene polymer is a polyalkylene homopolymer or a copolymer containing a major proportion of polyalkylene.

15. A process for preparing a modified polyalkylene polymer product from a precursor polyalkylene polymer product according to claim 14, wherein the polyalkylene polymer is unsubstituted polyalkylene homopolymer.

16. A process for preparing a modified polyalkylene polymer product from a precursor polyalkylene polymer product according to claim 1, wherein the polyalkylene polymer undergoes a further step of annealing after being subjected to UV radiation.

17. A process for preparing a modified polyalkylene polymer product from a precursor polyalkylene polymer product according to claim 16, wherein the annealing step takes place in an environment which is substantially free of oxygen gas but which comprises at least one of the said species.

18. A process for preparing a modified polyalkylene polymer product from a precursor polyalkylene polymer product according to claim 17, wherein the annealing step takes place in an environment which is substantially free of oxygen gas and comprises both of the said species.

19. A process for preparing a modified polyalkylene polymer product from a precursor polyalkylene polymer product according to claim 16, wherein the annealing step takes place at a temperature which avoids rapid evaporation of the species.

20. A process for preparing a modified polyalkylene polymer product from a precursor polyalkylene polymer product according to claim 16, wherein the annealing step takes place at a temperature between 50° C. and 150° C.

21. A process for preparing a modified polyalkylene polymer product from a precursor polyalkylene polymer product according to claim 16, wherein the environment for the annealing step is a gaseous environment.

22. A process for preparing a modified polyalkylene polymer product from a precursor polyalkylene polymer product according to claim 1, wherein the crosslinking species for use in the present invention are those which are gaseous under the treatment conditions employed and are able to diffuse into the polyalkylene polymer under the treatment conditions employed.

23. A process for preparing a modified polyalkylene polymer product from a precursor polyalkylene polymer product according to claim 22, wherein said crosslinking species is selected from unsubstituted $C_{4-8}$ alkenes having at least two double bonds.

24. A process for preparing a modified polyalkylene polymer product from a precursor polyalkylene polymer product according to claim 23, wherein the alkenes for use as crosslinking agents in the present invention have at least two conjugated double bonds.

25. A process for preparing a modified polyalkylene polymer product from a precursor polyalkylene polymer product according to claim 1, wherein the crosslinking agent is chosen from a suitable compound which forms radicals upon hydrogen extraction and which does not result in the loss of radical sites.

26. A process for preparing a modified polyalkylene polymer product from a precursor polyalkylene polymer product according to claim 25, wherein the crosslinking agents are taken from $C_{3-9}$ cycloalkanes.

27. A process for preparing a modified polyalkylene polymer product from a precursor polyalkylene polymer product according to claim 26, wherein the cycloalkanes are selected from cyclopropane, cyclobutane, cyclopentane, cyclohexane, cycloheptane and cycloctane.

28. A process for preparing a modified polyalkylene polymer product from a precursor polyalkylene polymer product according to claim 27, wherein cyclohexane is used.

29. A process for preparing a modified polyalkylene polymer product from a precursor polyalkylene polymer product according to claim 1, wherein the irradiation step is effected at a temperature not exceeding 100° C.

30. A process for preparing a modified polyalkylene polymer product from a precursor polyalkylene polymer product according to claim 1, wherein the polyalkylene polymer is in the form of a film.

31. A process for preparing a modified polyalkylene polymer product from a precursor polyalkylene polymer product according to claim 1, wherein the polyalkylene is polyethylene.

32. A process for preparing a modified polyalkylene polymer product from a precursor polyalkylene polymer product according to claim 1, wherein the polyalkylene is a polypropylene.

33. A modified polyalkylene polymer product produced by a process in accordance with claim 1.

34. A modified polyethylene polymer product produced by a process in accordance with claim 1.

35. A modified polypropylene polymer product produced by a process in accordance with claim 1.

* * * * *